US008635157B2

(12) United States Patent (10) Patent No.: US 8,635,157 B2
Smith et al. (45) Date of Patent: Jan. 21, 2014

(54) MOBILE SYSTEM AND METHOD FOR PAYMENTS AND NON-FINANCIAL TRANSACTIONS

(75) Inventors: Randy Smith, Aliso Viejo, CA (US); Earl Hornbostel, Mission Viejo, CA (US); Steve Valenzuela, La Habra, CA (US); Ryan Young, Placentia, CA (US)

(73) Assignee: Payme, Inc., La Canada, CA (US)

( * ) Notice: Subject to any disclaimer, the term of this patent is extended or adjusted under 35 U.S.C. 154(b) by 114 days.

(21) Appl. No.: 13/186,260

(22) Filed: Jul. 19, 2011

(65) Prior Publication Data

US 2012/0016731 A1 Jan. 19, 2012

Related U.S. Application Data

(60) Provisional application No. 61/344,563, filed on Aug. 23, 2010, provisional application No. 61/399,793, filed on Jul. 19, 2010.

(51) Int. Cl.
 *G06Q 40/00* (2012.01)
(52) U.S. Cl.
 USPC ................... 705/41; 705/44; 705/39; 705/40
(58) Field of Classification Search
 USPC .......................................................... 705/41
 See application file for complete search history.

(56) References Cited

U.S. PATENT DOCUMENTS

| | | | | |
|---|---|---|---|---|
| 4,933,536 A | * | 6/1990 | Lindemann et al. | 235/375 |
| 7,835,946 B2 | * | 11/2010 | Goren et al. | 705/26.8 |
| 2007/0022058 A1 | | 1/2007 | Labrou et al. | |
| 2007/0233615 A1 | * | 10/2007 | Tumminaro | 705/75 |
| 2008/0319869 A1 | * | 12/2008 | Carlson et al. | 705/26 |
| 2009/0063312 A1 | * | 3/2009 | Hurst | 705/30 |
| 2009/0119190 A1 | | 5/2009 | Realini | |

OTHER PUBLICATIONS

"China IT and Telecom Report", Daily News Briefs: Nov. 8, 2002. Retrived from Dialog.*

* cited by examiner

*Primary Examiner* — Hai Tran
(74) *Attorney, Agent, or Firm* — Sheppard Mullin Richter & Hampton LLP

(57) ABSTRACT

A method and system for mobile commerce, communication, and transaction processing to real-world POS, web, e-commerce, virtual terminal, mobile personal digital assistant, mobile phone, mobile device, or other computer based transactions involving either one or both financial and non-financial such as loyalty based transactions as a mobile payment system is described. One embodiment comprises using a mobile phone via a consumer mobile software application (CMA) in lieu of a consumer card (examples include physical, virtual, or chips) to conduct payment transactions in the Real or Virtual World of commerce. An embodiment is related to making payments to real-world stores via having the CMA on a mobile device on behalf of the consumer present to conduct transactions and no physical card required.

20 Claims, 9 Drawing Sheets

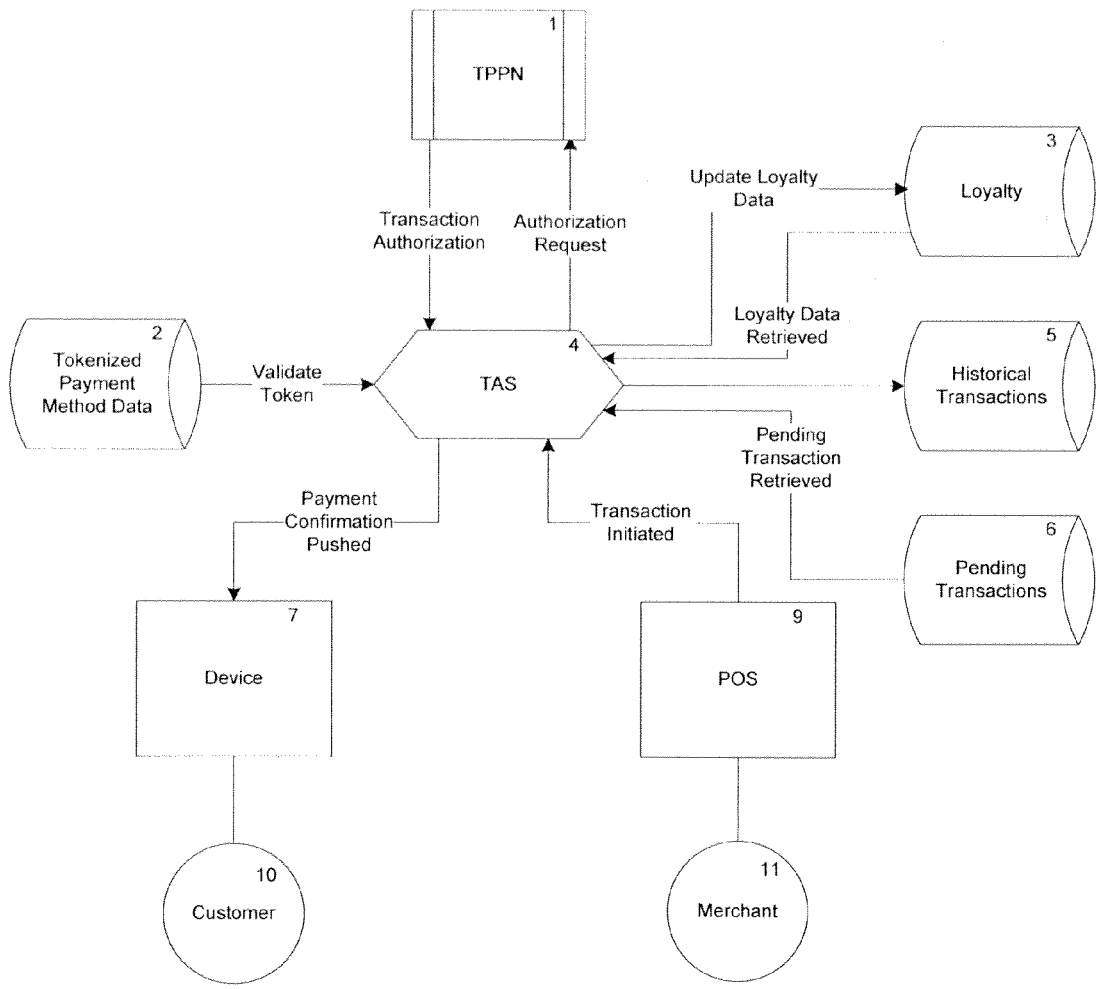

Fig. 6

| DeviceTransactionRequest |
|---|
| +TransmissionCode : string |
| +MerchantId : string |
| +BillingId : string |
| +TerminalCode : string |
| +Amount : decimal |
| |

| POSTransactionRequest |
|---|
| +MerchantNumber : string |
| +TerminalId : string |
| +ProcessAuthorizationCode : string |
| +ProcessorReferenceNumber : string |
| +MerchantReferenceNumber : string |
| +InvoiceNumber : string |
| +OperatorId : string |
| +Amount : double |
| -TransactionDate : DateTime |

MOBILE SYSTEM AND METHOD FOR PAYMENTS AND NON-FINANCIAL TRANSACTIONS

CROSS-REFERENCE TO RELATED APPLICATIONS

This application claims priority to U.S. Provisional Application No. 61/399,793, filed on. Jul. 19, 2010 and to U.S. Provisional Application No. 61/344,563, filed on Aug. 23, 2010, which are incorporated herein by reference in their entireties.

TECHNICAL FIELD

The present invention relates generally to mobile systems and methods for payments and non-financial transactions.

DESCRIPTION OF THE RELATED ART

An emerging technology in the industry of payment processing is mobile payments. Mobile payments addresses many needs including offering greater convenience to consumers through eliminating the use of plastic cards, stickers, or key tags that use magnetic-striped, radio frequency identification (RFID), barcodes, blue tooth, or chips to store and transmit payment account data to authorize and conduct payment transactions at point of sale terminals. Current mobile payment solutions might include the use of near-field communication (NFC), barcodes including two dimensional barcodes, Bluetooth, or significant software upgrades to the point of sale (POS) system. Each solution has significant unique setbacks for merchant and consumer adoption.

Conventional cards store payment account data on the card and payment terminal readers at point of sale in stores will read and capture the data required to submit and gain a transaction authorization and approval for the transaction from the card issuer. Since the invention of the magnetic striped cards and their readers, new inventions have been centered around improving the security and speed by which transactions occur, but most methods still employ using a physical or virtual card that is read by a point of sale terminal. Through a variety of means, the payment account data by which the consumer is going to make a payment to a merchant is captured by the merchant payment terminal, via magnetic-stripe, RFID, Bluetooth, barcodes or chips and submitted for authorization and approval. The industry method of capturing card payment data has created the necessity for merchants to have payment terminal readers that are able to read the cards being used to make payments at their stores.

Virtual mobile or web enabled software applications are now in use which display an electronic barcode on the mobile phone screen. This requires the card data encoded in the barcode to be read by barcode readers at the POS to initiate the transaction. RFID or NFC technology transmits the payment card data to merchant payment terminals equipped to receive the radio signal. The cards or stickers that utilize this NFC solution must be swiped by the NFC enabled payment terminal reader in order to capture the payment card data and thus initiate the transaction. This NFC technology has also been used in phones to transmit the card data. The payment card data may be stored on the phone in a software application or it may be accessed via a mobile or web accessed software application that supplies the card data from an electronic wallet. With the prescribed NFC tag stored on the phone through a software application method a payment card or sticker equipped with NFC is not required to be present to capture the payment card data and to initiate the transaction as the NFC technology is embedded into the mobile phone itself. This NFC technology embedded into mobile phones or devices still requires a payment terminal capable of reading the payment card data transmitted via the NFC technology. In the United States, this technology is as of yet mainstream and intermediate solutions have also been developed that plug NFC technology into a port on the mobile phone.

Security remains a significant concern for most, if not all mobile solutions, as they send the consumer card data at point of sale to the merchant. This opens the transmission of the card data to hack attempts as was observed when the Hannaford Brothers regional grocery company announced a data breach on Mar. 17, 2008. In the Hannaford Brothers case, when the consumer swiped their magnetic payment card at a POS terminal, the track data from the customer card (the PAN and possibly the expiration date and PIN with PIN related transactions) was transmitted from the POS terminal to the store server and then from the store server out to the bank responsible for authorizing the transaction. The criminals were able to steal this data while it was moving through this authorization process (in-transit) by inserting a malware program onto the store server. It was estimated over 4.2 million credit and debit card numbers were compromised through every one of the chain's 300 grocery stores.

The Hannaford Brothers case was cause for even greater concern as the data theft was occurring despite the fact that Hannaford Brothers had a security firm to monitor its network security and their stores used a modern POS system that should have been secure (in fact, Hannaford Brothers had been featured in a 2005 Computerworld article as an example of a retailer aggressively updating and modernizing their POS system (Hoffman, 2005)). An NFC solution could increase risk as the ability to intercept in-transit data is greatly increased when the medium of exchange is no longer limited to a magnetic card swipe and instead broadened by the use of radio technology. The inventors of this patent application have observed that by eliminating the transmission of the sensitive financial card data at the point of sale, security measures are able to be greatly increased in protecting the financial transaction and account information exchanged during the transaction process whereby the financial account data is only exchanged between trusted financial institutions and not the merchant or POS system.

A recent alternative payment solution developed by Mocapay, Inc. offers a mobile payment solution whereas consumers pre-authorize payment to a store from a virtual electronic gift card. While yet to be seen in the form of a product, Mocapay discloses in US Patent Publication No. 2009/0063312 A1 an ability to use a credit card transaction; however the processing and interaction with the merchant's point of sale remains the same. The consumer utilizes a mobile application to pre-approve a transaction at a specific merchant. After the user submits their approval, the software issues an authorization code. This code is displayed numerically or in the form a barcode on their phone. When the user is at checkout they tell the merchant or cashier they will be paying using Mocapay. The consumer then shows the merchant the approval code to be entered into the point of sale payment terminal to complete the transaction or they may scan the barcode to complete the transaction. Either method requires that the merchant's point of sale payment terminal or software system be changed or reprogrammed to be able to enter in and accept the authorization code generated and provided to the consumer's mobile device upon displaying it to the merchant.

Other methods of conducting payment or loyalty transactions require a physical chip or card or virtual card displayed in the form of a barcode to capture the payment card data at point of sale from which the funds will be drawn upon.

BRIEF SUMMARY OF EMBODIMENTS OF THE INVENTION

In view of the above-identified drawbacks, there exists a need for an alternative mobile commerce system and method. Embodiments of the present invention provide systems and methods for mobile commerce, communication, and transaction processing to real-world POS, web, E-commerce, virtual terminal, mobile PDA, mobile phone, or other computer based transactions involving either financial and/or non-financial transactions (such as loyalty based transactions) as a mobile payment system. Some embodiments of the invention provide a more readily available product for market adoption through a highly secure, non-card data transmitting POS process. Such a product provides a relatively low cost solution to implement at the merchant, and is a scalable product for ease of distribution to address both consumer and merchant adoption needs.

One embodiment of the invention is directed toward using a mobile phone or mobile device via a consumer mobile software application of the mobile payment system (hereinafter referred to as the consumer mobile application or CMA) in lieu of a consumer card (e.g., a physical card, virtual card, or chips) to conduct payment transactions in the real or virtual world of commerce. One implementation is related to making payments to real-world stores by having only the mobile phone or mobile device on behalf of the consumer to conduct transactions and requiring no card or exchange of card account information.

The transaction route may be initiated as any conventional payment transaction to gain authorization for the transaction from the card issuer. In cases where an authorization request is made to an issuer to gain an additional authorization from the mobile payment service provider for a merchant initiated mobile payment transaction, the transaction is rerouted to obtain additional authorization prior to issuing a standard authorization request to the issuer (such as account status and fund verification).

The various embodiments of the invention can include pre-set and designated cards (hereinafter referred to as mobile payment cards) used for the express purpose of requiring the prescribed additional authorization. Such cards may be any type of payment card such as a credit, debit, gift, alternative payment, or loyalty card. This additional method of authorization allows consumers to directly authorize a payment transaction via their mobile device using proprietary software such as the CMA. These pre-set or designated mobile payment cards, with a pre-designated card range, are used to initiate mobile payment transactions and may be initially programmed for use only at merchant locations where the cards are permitted for use. However, these mobile payment cards are read and routed by POS terminals or systems as would be any type of payment card. Again, these cards may comprise credit cards, debit cards, pin-debit cards, gift cards, or alternative form of payment, and therefore may be open or closed-loop. Therefore, they may comprise cards using a payment network such as MasterCard, Visa, Discover, American Express, STAR Network (or any other pin-debit card) or any host-to-host or proprietary non-financial, gift or private payment or communication network of any type used to conduct payment or loyalty transactions, not excluding mobile carrier network communication channels.

These specific use and merchant restricted access mobile payment cards are used to initiate a mobile payment transaction. As described above, the pre-set or pre-designated card number is in one illustrative embodiment read by a POS payment terminal or system and an authorization request is forwarded to a processor in a conventional manner or method. Upon reaching the processor, the issuer Identification Number (TIN) or Bank Identification Number (BIN) is read to route to the payment network (Visa/MasterCard/Discover/American Express—open loop) or a proprietary (closed-loop) gift card network.

In embodiments using an open-loop IIN or BIN (together herein referenced as IIN) as assigned by a payment network, the IIN is forwarded to the payment network as per current industry standard routing methods. Thereafter, the payment network routes the authorization to a backend switch where the transaction is then forwarded to the mobile payment service provider (mimicking an issuer's card management system) through a conventional or proprietary message format that is used to route to card management systems. Most processor systems are set up to accommodate specific routing for third parties that have a specified IIN. As such, when the processor reads a closed-loop IIN, the transaction may be rerouted to the mobile payment service provider through a conventional or proprietary message format that is used to route to card management systems. The additional authorization is routed to the mobile payment service provider's TAS (transaction authorization system) to match the merchant's authorization request with the consumer's transaction approval for the request.

Upon the merchant request matching the consumer approval of the transaction, the transaction is routed from the TAS to a mobile electronic wallet containing the payment account information as previously selected by the consumer from which to make the mobile or web enabled payment. From here the transaction is routed to gain a conventional authorization from the card issuer of the payment method of choice as selected by the consumer from a mobile electronic wallet (herein referenced as e-wallet). Upon approval from the card issuer, the transaction authorization approval is sent back to the TAS from the payment gateway partner that stores the e-wallet. At this point, the authorization data is sent back to the phone and originating POS system or terminal in the required format of the phone or system, thereby completing the transaction.

One illustrative embodiment of this invention from the consumer's perspective allows mobile payment system users to utilize the CMA on their mobile web enabled phone or device by: (i) opening the CMA, (ii) entering their user PIN, (iii) selecting the specific merchant listed in the CMA, (iv) selecting a method of payment available to the user (e.g., credit, debit, gift or alternative payment form), (v) entering the TID (terminal identifier) of the merchant, (vi) selecting the "Pay Now" button, and (vii) announcing the merchant to process the mobile payment transaction. This announcement can be non-verbal by simply displaying the "Show Phone to Cashier" screen to the trained merchant. Regarding the step of selecting the specific merchant listed in the CMA, GPS geo-location services may be employed to identify the phone's or device's physical location and match that against the merchant's store front in the CMA so that a listing of merchants displays the merchant's store on top of the list. In some embodiments, a search function is available for the user by merchant's store name or ID should the mobile device's GPS service be absent or disabled by the user. Groups can be utilized during the search process for the merchants having multiple locations or for displaying merchants associated with a specific group such as a store mall, plaza, or special interest.

Another illustrative embodiment of this invention from the consumer's perspective allows for pre-authorization transactions such as those found in full service restaurants, hotels, and car rental agencies. Such a method may comprise the user: (i) opening the CMA, (ii) entering their user PIN, (iii) selecting the specific merchant listed in the CMA (such as through prescribed GPS or search functions of the CMA), (iv) selecting a method of payment available to the user (e.g., credit, debit, gift or alternative payment form), (v) entering the virtual table, ticket, invoice, or order number assigned by the merchant POS, (vi) selecting the "Pay Now" button, and (vii) announcing the merchant to process the mobile payment system transaction. The announcement can be non-verbal by simply displaying the "Show Phone to Cashier" screen or in lieu of showing the phone screen to cashier. The mobile phone user may be instructed to place a mobile payment instruction/marketing card [paper or plastic] into the end of the bill fold in place of where the credit card is normally placed. This embodiment therefore does not require a pay-at-table device to conduct a mobile transaction as might be required by NFC type solutions. As used herein, a merchant POS system may comprises a POS system used for electronic commerce or a conventional POS system located in a real world store.

Another illustrative embodiment includes the TID (terminal identifier) as a number posted in the form of either an adhesive sticker adhered to the merchant's terminal or location nearby that the consumer either scans as a barcode version or enters in a numeric value representing the TID. The barcode version of the TID can be a standard or 2D barcode such as a QR (Quick Response) code that is scanned by the consumer's mobile device through the use of a camera on the mobile device. Another illustrative embodiment allows the TID to be represented by the use of a two-factor authentication token device (such as might be supplied by RSA, the security division of EMC), whereby a code is generated according to an algorithm set by the device and displayed by the merchant at the POS to allow the consumer to enter in the code into the CSA.

Another illustrative embodiment of this invention from the merchant's perspective allows the merchant to use a merchant mobile payment card with a magnetic stripe or NFC equipped card to initiate the mobile payment system transaction. This solution allows the merchant to participate in mobile transactions without POS interface hardware upgrades (such as NFC and Bluetooth), use of barcodes, SMS text messaging, or software (such as Mocapay's authorization code software), and still affords the consumer the convenience of paying by phone and not sharing their financial data with the merchant or storing it on the phone. The merchants also gain by not obtaining the consumer's sensitive financial data that becomes a responsibility and liability of the merchant. The mobile payment system transaction is initiated by swiping the merchant's mobile payment card through the merchant's existing payment terminal or POS when prompted by the consumer's announcement to conduct a mobile payment system transaction. The merchant receives a standard confirmation of successful payment or error code at their existing POS as is already programmed to handle. This process is accomplished by utilizing an IIN to route transactions through the merchant POS, middleware software provider, frontend switch, gateway, processor, payment network, or backend switch.

In one example, the mobile payment service provider may enter into an agreement with one of the payment networks (such as Discover, Visa, MasterCard, American Express, or JCB). Upon receiving the card number during the normal transaction authorization process used for financial and non-financial payments and identifying the unique IIN assigned to the mobile payment service provider (such as in accordance with ISO/IEC 7812), the payment network routes the transaction to TAS (Transaction Authorization System) for transaction authentication prior to routing for payment authorization. At the TAS, the transaction is used to link the process with the consumer's device, authenticate the transaction, seek payment authorization through the TPPN (third party payment network or gateway provider for mobile payment system services) and send a response (approval or related error code such as non-sufficient funds—NSF) to the merchant's existing POS terminal. Such an agreement with a payment network or other entity requires the company to integrate with the mobile payment service provider's TAS system for transaction rerouting. As such, the TAS system has an API (application programming interface) model that is compliant with the payment network or other party using the standard adopted by such entity. One example of a standard that might be used is International Organization for Standardization or ISO 8583 on Financial transaction card originated messages.

Another illustrative embodiment may utilize an identification card number with the mobile payment service provider's IIN. IIN and BIN are terms used interchangeably herein and represent the number (commonly the first 6 digits) used for determining the transaction routing destination. The merchant simply enters the mobile payment card number utilizing the mobile payment service provider's IIN into their POS system in lieu of swiping a mobile payment card through the payment terminal or POS.

Another illustrative embodiment may utilize a software button programmed in the POS system in lieu of a merchant mobile payment card. In this embodiment, the software button redirects the merchant's transaction to the mobile payment service provider's TAS solution through the use of the mobile payment system's API. No authorization code is required for the merchant to input on their POS system and the merchant may only be required to initiate the mobile payment system's transaction process by pushing or selecting the software button.

Another illustrative embodiment may utilize a virtual terminal in lieu of a merchant mobile payment card. Such a virtual terminal solution functions similar to the software button option for the POS. However this solution comprises a standalone software or hardware device such as a mobile personal digital assistant, mobile phone, other mobile device, or computer based system or device or software application installed alongside the POS software and residing on the same platform and hardware of the merchant POS.

Another illustrative embodiment involves a system d method that records payment transaction data, such as merchant ID, terminal ID, payment amount, transaction ID, time and date of the transaction, and user ID. Accordingly, the system possesses sufficient information for running a variety of loyalty programs and offerings for the merchant. This embodiment allows users to conduct loyalty only transactions using the mobile phone as well. In some cases, the user may tell the store clerk that she will be using her mobile rewards card, and then she will pay with cash or card as usual.

Another illustrative embodiment may be used to pay mobile, web or Internet merchants from the CMA. As for a web or Internet related transaction enabled via the merchant's website, the merchant only needs to add a button programmed in conjunction with the mobile payment service provider's API to enable the transaction to begin. Upon the consumer clicking on the button via the merchant's web or Internet site or link to begin the mobile payment system transaction, the transaction may be routed according to several methods. A first method entails a conventional payment transaction using the same method as a mobile payment card solution as described above. A second method involves routing the transaction directly to the mobile payment service provider's TAS (Transaction Authorization System) that matches the merchant request with the consumer authorization and approval of a transaction. The transaction proceeds normally from this point. A third method involves clicking on a button such that the authorization is sent first through the online or e-commerce merchant gateway, and is then routed directly or through a processor or payment network to gain consumer authorization. Each of these methods utilizes the method of matching merchant authorization request with consumer authorization approval via the CMA, as described.

In each of the three routing methods, the actual card number is not provided to the e-commerce merchant. Instead, an authorization system first authorizes and authenticates each transaction and then accesses the e-wallet software to gain the payment card data to run a secondary, but conventional payment authorization. The e-wallet is consumer centric because it enables consumers to upload all types of card accounts to the e-wallet. The e-wallet is a service provided by the TPPN (third Party payment network or gateway provider for mobile payment services) and may be a customized e-wallet solution for the mobile payment system. The CMA has ability to select the tokenized payment method data used by the TAS for calling the TPPN's e-wallet according to the corresponding token and card account of the user. This enables the user to select a method of payment available to the user and in accordance with the card information the user has uploaded to the mobile payment system directly or via the TPPN's web portal. As for a mobile merchant related transaction, any person can act as a merchant and accept mobile payments by downloading and installing the software related to their mobile device such as through the use of the virtual terminal software provided by the mobile payment service provider. In some cases, the virtual terminal software may be unique from the CMA and exist as a separate mobile software application for merchant related transactions. Additionally, the CMA of the mobile payment system could enable a function to allow a consumer to send a payment to any other mobile payment service provider's users or consumers, thus creating a consumer-to-consumer transaction relationship.

Another illustrative embodiment involves adding a peripheral that connects to a merchant POS system or payment terminal via a communication wire or cable or via any type of wireless data connection. This peripheral could simply be a "Button" to push and could be a plastic, metal or glass button. The button can serve to initiate a mobile payment system transaction solution. In some cases, the button may also be part of a separate device, such as a mobile phone, pager or a keychain to be used by the cashier to initiate payments for the invention's mobile payment solution. This embodiment can be enabled via a hardware and software solution on the independent device. The button could also be displayed virtually on a touch screen enabled monitor and pressed by the cashier or the consumer to initiate a payment transaction for the solution. In one implementation, the button requires a minimal amount of coding to enable the button such that it processes the transaction with the mobile payment service provider's IIN (in place of card swipe that transmits card data) and forwards it to TAS (directly from POS or indirectly such as through middleware, frontend switch, gateway, processor, payment networks, or a backend switch). In such embodiments, the button may be pressed to begin the transaction by either the consumer or the merchant cashier to initiate a mobile payment system transaction for the invention's solution. When the button is pushed it replicates the swiping of a card or having to manually enter a card number to initiate a mobile payment transaction to the mobile payment service provider's system.

Another illustrative embodiment entails allowing a consumer to utilize the CMA to access an ATM (Automated Teller Machine, Cash Point, or Cash Machine) used for consumer financial transactions including obtaining cash withdrawals or making cash deposits. The CMA obviates the need and use of an issuer's magnetic card for account access and authorization as the necessary card account information is stored in the e-wallet of the mobile payment system. The ATM only requires a button added prior to conducting any transaction for mobile ATM transactions. The button replaces the card swipe fun on and otherwise allows the ATM to behave in a similar fashion as it is customarily used.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 6 illustrates one embodiment of the flow involved when the merchant POS system attempts to complete a transaction.

FIG. 7 illustrates one embodiment of the device transaction request table.

FIG. 8 illustrates one embodiment of the POS transaction request table.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Various illustrative embodiments of the invention address the problem of establishing merchant services (i.e., processing electronic payments) in a mobile environment, while increasing financial and personal identity data security and minimizing equipment and merchant adoption costs. Such embodiments may be accomplished through the use of additional authentication in place of financial account exchange between merchants and consumers. This is enabled by multiple optional paths for additional authentication including IIN transaction rerouting, direct communication with POS software, or a virtual terminal solution utilizing similar transaction rerouting processes.

Figure 1:
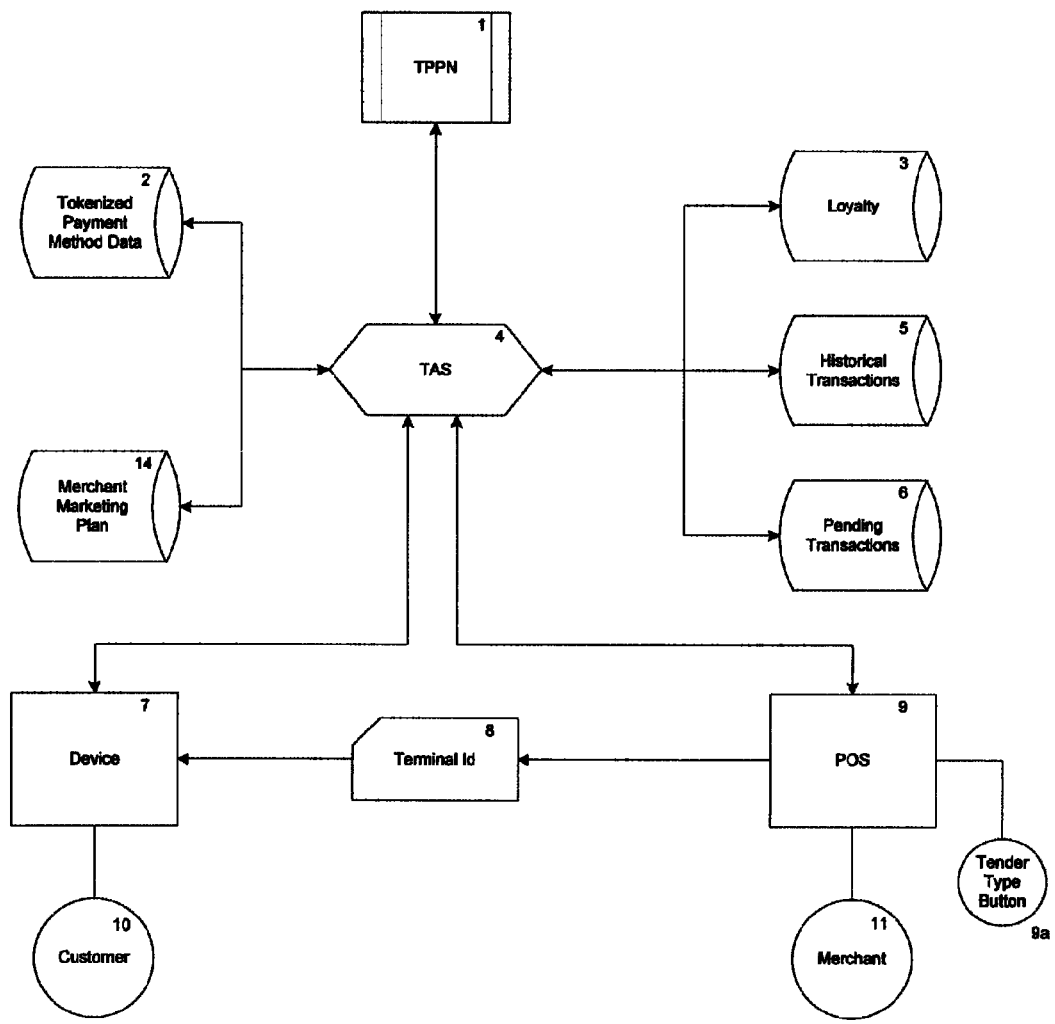
FIG. 1 is an overview of one embodiment of the mobile payment system.

Referring now to FIG. 1, one embodiment of a mobile payment system is depicted. In particular, a TPPN 1 may comprise any processing platform, card association, or other processing host that is responsible for the formal authorization and settlement of the consumer and merchant payment information (See FIG. 9). The TPPN 1 should be an entity that is compliant and certified according to the industry rules, regulations, and best practices. In addition to authorization and settlement processing, the TPPN 1 may provide additional features and functionalities including transaction reporting, cardholder data storage, fraud screening and protection, and related processing offerings.

Still referring to FIG. 1, a TAS 4 coordinates the activities among a customer device 7 that hosts the CMA (consumer mobile software application), a POS system 9, and the TPPN 1, in order to authorize and void transactions. The TAS 4 may also store and retrieve loyalty information from a loyalty data store 3 that may be used by merchant 11 to offer discounts and additional services to the customer 10 through the device 7. The TAS 4 may also be used by the customer 10 to store payment method data at the TPPN 1. In order to protect the customer's data, TAS 4 only stores tokenized versions of the payment methods in a tokenized payment method data store 2. The tokenized versions reference the actual payment methods stored at the TPPN 1. A tender type button 9a serves to initiate the transaction by the merchant. In some embodiments, the tender type button 9a may be replaced with a merchant mobile payment card having a magnetic swipe or a card number that can be keyed into the POS system 9. In some cases, a virtual terminal solution or device can be employed that acts in much the same manner as the tender type button 9a.

With further reference to FIG. 1, a terminal ID 8 serves to link the customer 10 and merchant 11 upon the transaction reaching the TAS 4. One method of this communication can be by the merchant posting a sticker, label, or other display of the terminal ID 8 on or near the POS 9 in order for the customer 10 to read and enter the terminal ID 8 into the CMA. The terminal ID 8 can exist as a numeric value, a barcode, or other representation including technology opportunities such as Bluetooth, RFID, NFC, QR codes, Two Factor Authentication, etc., that can be shared with the CMA. The CMA on the device submits a transaction to the TAS 4 for a purchase at a merchant POS and the transaction is stored by the TAS 4 as a pending transaction 6. The POS 9 then submits a transaction to the TAS 4 and the next available pending transaction with the same terminal ID 8 for that merchant 11 completes the additional authentication step required by the mobile payment system prior to submitting the transaction to the TPPN 1 for account authorization. In some embodiments, historical transactions 5 are available for review by the customer and merchants as facilitated by the TAS 4. The merchant marketing plan 14 (described below with respect to FIGS. 3 and 4) relates to the plan used for action upon loyalty data accumulated through transactions.

Figure 2:
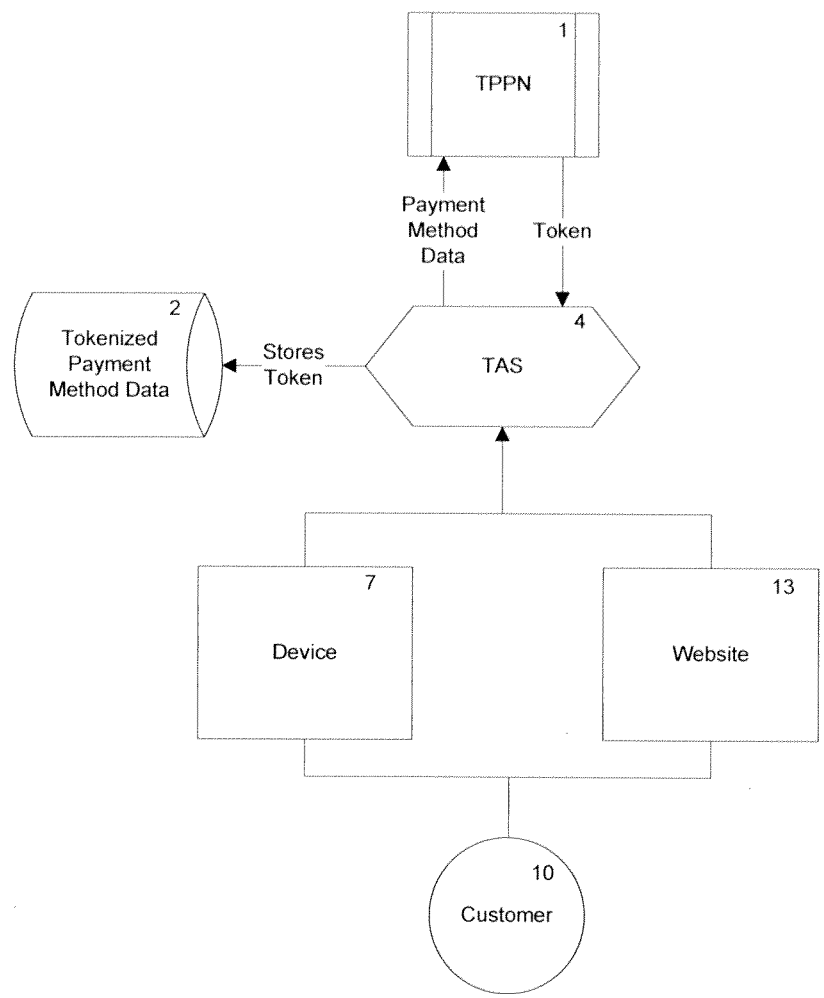
FIG. 2 illustrates one embodiment of the flow involved in the payment method storage and retrieval process.

FIG. 2 illustrates one embodiment of the flow involved in the payment method storage and retrieval process. Specifically, the customer 10 may interface with either the CMA on the device 7, or a website 13 that allows the customer to perform similar functions as the CMA. The customer may establish a user account for the mobile payment system by logging into the website or device via the CMA and requesting a user ID by supplying necessary information such as full name, email, PIN for CMA, password for website access, and optionally a payment loyalty card account information. Thereafter, the system forwards the information to the TAS 4 and those items related to card account information are forwarded to the TPPN 1 as required for the e-wallet. The card account information is not stored by the TAS 4, which only serves to transmit the information to the TPPN 1 for initial establishment of a token to be stored as a part of the tokenized payment method data 2. Optionally, the tokenized payment method data 2 may be transmitted directly from a website portal offered by the TPPN 1 so as to prevent the TAS 4 and mobile payment system from responsibility of in-transit data.

Figure 3:
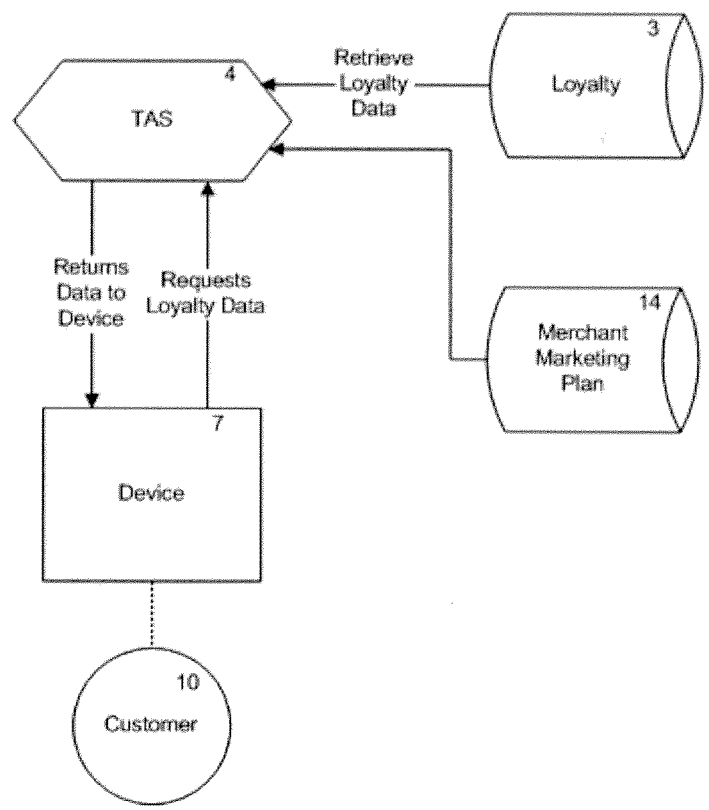
FIG. 3 illustrates one embodiment of the flow involved in retrieving daily deals and loyalty rewards.

FIG. 3 illustrates one illustrative embodiment of the flow involved in retrieving daily deals and loyalty rewards. In this embodiment, the customer 10 using the CMA on the device 7 conducts transactions at participating mobile payment system merchants. Through the use of the system, the merchant 11 is able to make a loyalty plan 3 and at least one merchant marketing plan 14 available to the customer 10 via the TAS 4. Though data transfers between all functions and the TAS 4 are in a bidirectional path flow, the arrows in the diagram suggest the primary path taken for sending data in response to a request. As an example of data traversing in this pattern occurs when the customer 10 uses the device 7 and corresponding CMA for purchases at a particular merchant 11 on multiple occasions. In such an instance, the merchant 11 is able to offer in accordance with a merchant marketing plan 14 a free product (such as single serving of yogurt at a yogurt shop) after some frequency of visits by the customer 10 that is tracked as loyalty data.

Figure 4:
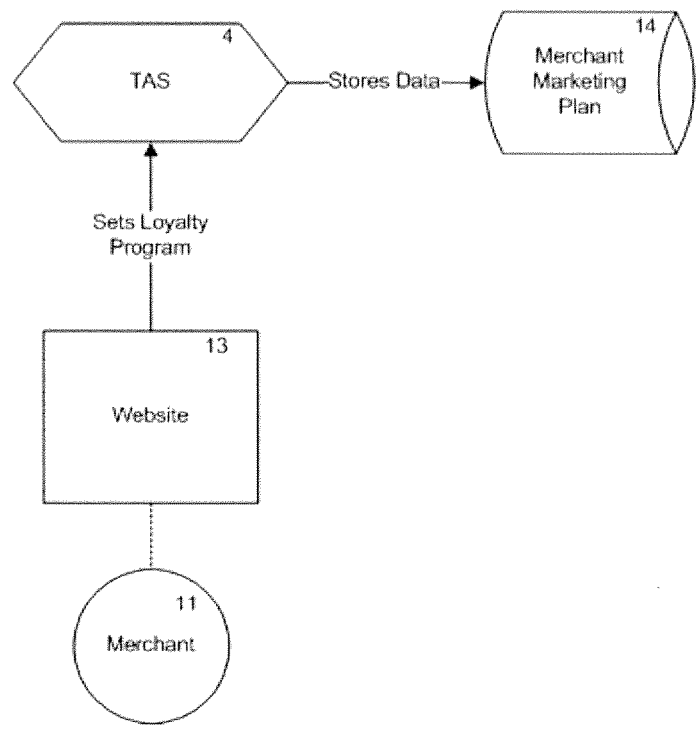
FIG. 4 illustrates one embodiment of the flow involved in setting a merchant marketing plan.

FIG. 4 illustrates one embodiment of the flow involved in setting a merchant marketing plan 14. In particular, the merchant 11 utilizes the website 13 of the mobile payment system to define a merchant marketing plan 14. As in the previous example regarding yogurt, the merchant 11 defines the rule as acceptable to the merchant 11. The rule might be that ten visits and purchases of a large yogurt grants the customer a free yogurt. As the merchant 11 defines and sets the merchant marketing plan 14 and defines the loyalty value expected (customer's eleventh visit to purchase a large yogurt is free), a loyalty program is set for the merchant marketing plan and the data is sent to the TAS 4 and stored in the merchant marketing plan 14.

Figure 5:
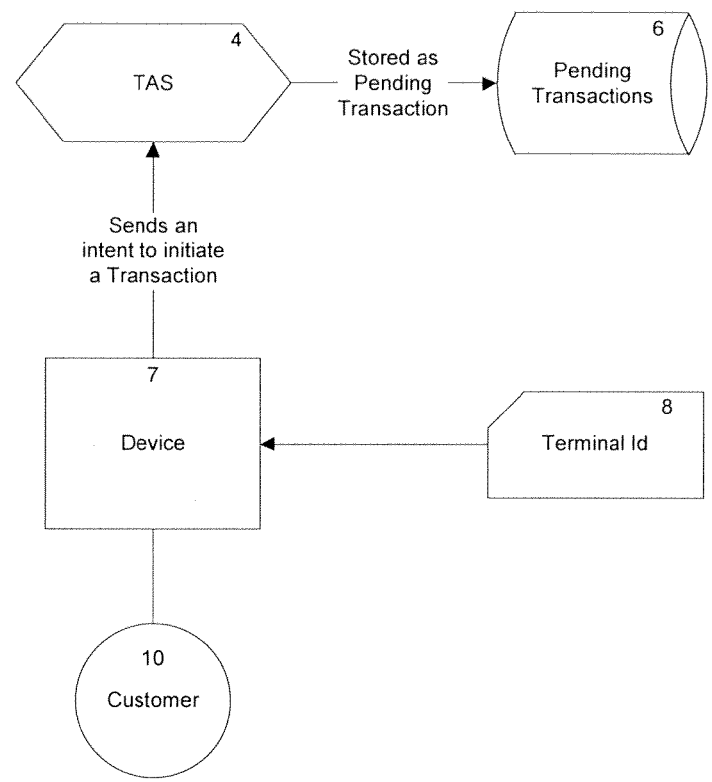
FIG. 5 illustrates one embodiment of the flow involved in the initiation of a transaction through the consumer's device or CMA.

FIG. 5 illustrates one embodiment of the flow involved in the initiation of a transaction through the customer's device. Specifically, the terminal ID 8 serves to link the customer 10 and merchant 11 upon the transaction reaching the TAS 4. The CMA on the device 7 sends an intent to initiate a transaction to the TAS 4 for a purchase at a merchant POS, and then the transaction is stored by the TAS 4 as a pending transaction 6. The POS then submits a transaction to the TAS 4 and the next available pending transaction 6 with the same terminal ID) 8 for that completes 11 completes the additional authentication step required by the mobile payment system prior to submitting the transaction to the TTPN 1 for account authorization.

FIG. 6 illustrates one embodiment of the flow involved when the POS system attempts to complete a transaction. Though data transfers between all functions and the TAS 4 are in a bidirectional path flow, the arrows in the diagram suggest the primary path taken for sending data in response to a related data request. The device 7 sends a pending transaction to the TAS 4 by way of the CMA (consumer mobile software application) upon a customer 10 intending to transact with a merchant 11 at their POS 9. The pending transactions 6 are stored by the TAS 4 and await the POS 9 to initiate the transaction. Once the transaction and pending transaction are linked by way of the terminal ID 8 and a merchant ID, the transaction is forwarded to the TPPN 1 utilizing the payment method selected by the customer 10 and is stored in the tokenized payment method data store 2 accessible by the TAS 4. The TPPN 1 is sent an authorization request by the TAS 4, and upon successful account authorization by the issuer of the corresponding account selected by the customer 10, the TPPN 1 issues a transaction authorization to the TAS 4. The TAS 4 records and updates loyalty data 3 for the transaction, and if applicable, also retrieves the loyalty data. The transaction is recorded in the historical transactions data store 5 while a payment confirmation is pushed to the device 7.

FIG. 7 illustrates one embodiment of a device transaction request table that provides a sample of what data might be exchanged. As would be appreciated by those of skill in the art, many variations of data transferred are possible without departing from the scope of the invention.

FIG. 8 illustrates one embodiment of a POS transaction request table that provides a sample of what data might be exchanged. As would be appreciated by those of skill in the art, many variations of data transferred are possible without departing from the scope of the invention.

Figure 9:
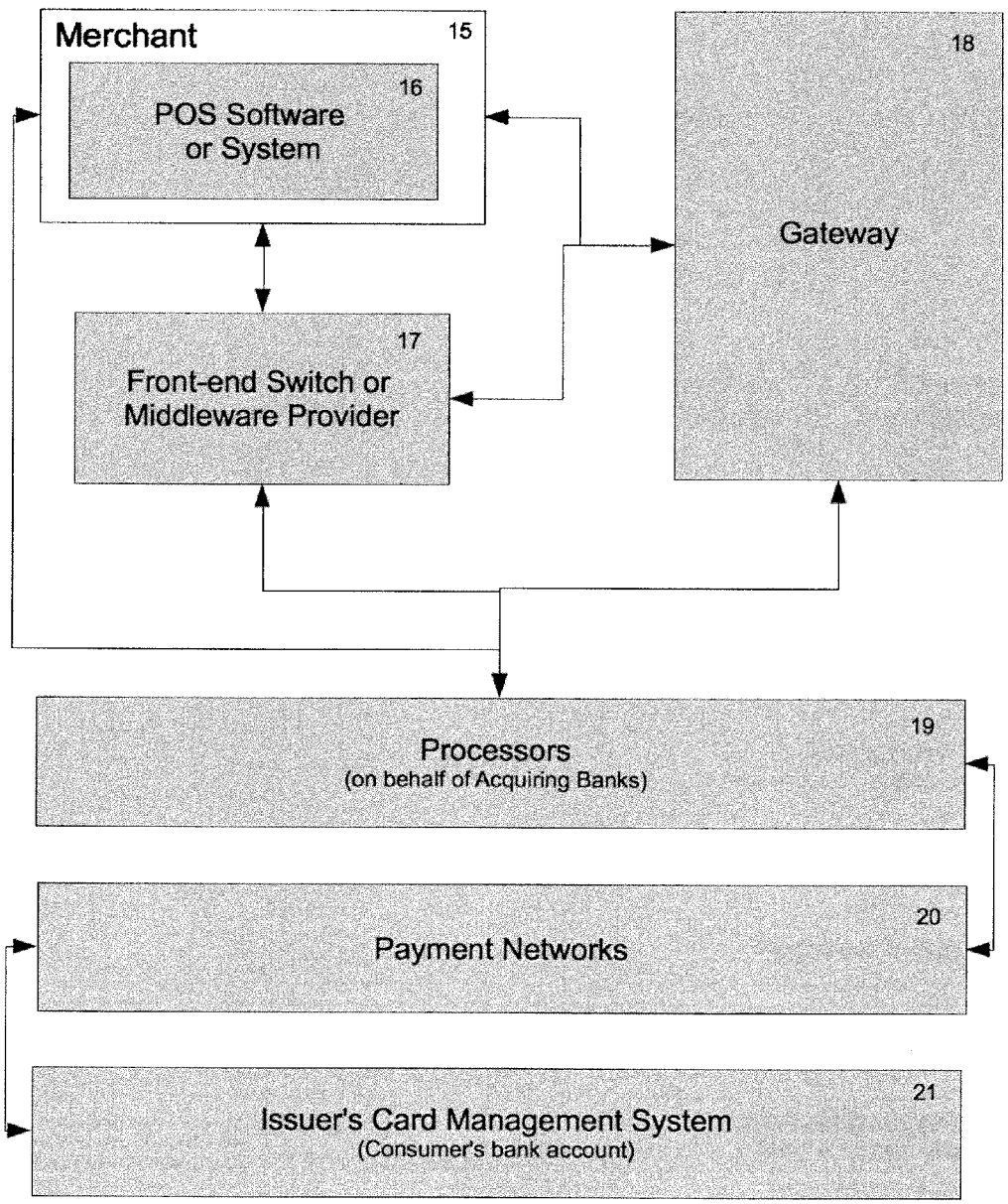
FIG. 9 illustrates the payment processing or routing of a transaction through the use of a standard payment card utilizing an IIN or BIN number, in accordance with an embodiment of the invention.

FIG. 9 illustrates the payment processing or routing of a transaction through the use of a standard payment card utilizing an IIN. Currently, the standard or traditional IIN routing process involves a transaction process beginning at a merchant 15, whereby a consumer makes a card transaction purchase at the merchant POS 16. The IIN on a payment card (Credit, Debit, Gift, etc) routes the payment transaction to the issuing bank's card management system or CMS 21 (where applicable) to obtain account authorization (sufficient or non-sufficient fund verification, etc). As depicted in FIG. 9, routing can occur direct from the POS 16 to the processors 19, or from the POS 16 the transaction can be routed to the front-end switch or middleware provider 17, or to gateways 18. The front-end switch or middleware provider 17 can also optionally connect to either the gateways 18 or the processors 19. Once the transaction has reached the processors 19 on behalf of the acquiring banks, the processor 19 routes the transaction over the payment networks 20 and to the CMS 21 in order to obtain an authorization. This process can be enhanced by an additional authentication validation of both user and merchant involved in a given transaction.

One embodiment of such an enhancement involves a transaction process beginning at the merchant 15, whereby a consumer makes a card transaction purchase at the POS 16 via a mobile device and without exchanging card account data. Assisting in the process, the mobile device is equipped with an e-wallet containing a tokenization of the card account data stored with a banking partner of the mobile software. The consumer uploads their sensitive payment card data one time to the mobile payment service provider's banking partner (TPPN) e-wallet solution. The e-wallet solution can contain any type of financial or non-financial payment or loyalty card tokens representing the card accounts. The merchant 15 is assigned a mobile payment card and the payment process entails the merchant 15 utilizing the mobile payment card to swipe for authentication (non-financial) processing. The merchant 15 and consumer's transaction meet at the TAS 4 as set forth hereinabove with respect to FIG. 1 prior to requesting a payment authorization through the TPPN or gateway provider 18, in order to obtain a conventional transaction authorization.

In an example embodiment, the mobile payment card is assigned to merchant 15, the card including the mobile payment service provider's IIN number within the card number, which distinguishes the transaction as one to be forwarded to the mobile payment system's TAS 4. Another embodiment might entail the POS software utilizing a button that requires a minimal amount of coding to enable the button such that it processes the transaction with a proprietary IIN (in place of card swipe that transmits card data) and forward to a proprietary TAS 4 (directly from POS system or indirectly such as through middleware, frontend switch, gateway, processor, payment networks, backend switch). In another embodiment, in lieu of the POS provider redirecting the transaction, a font-end switch or middleware provider 17, gateway 18, or processor 19 redirects the transaction to TAS 4 for transaction authentication. Another embodiment allows (in place of a magnetic card bearing the IIN assigned to the merchant 15) the merchant to key in the unique card number which includes IIN number assigned for TAS routing. Another embodiment allows any payment network 20 to route any transactions initiated on their network by a mobile payment card utilizing a network approved IIN.

Figure 10:
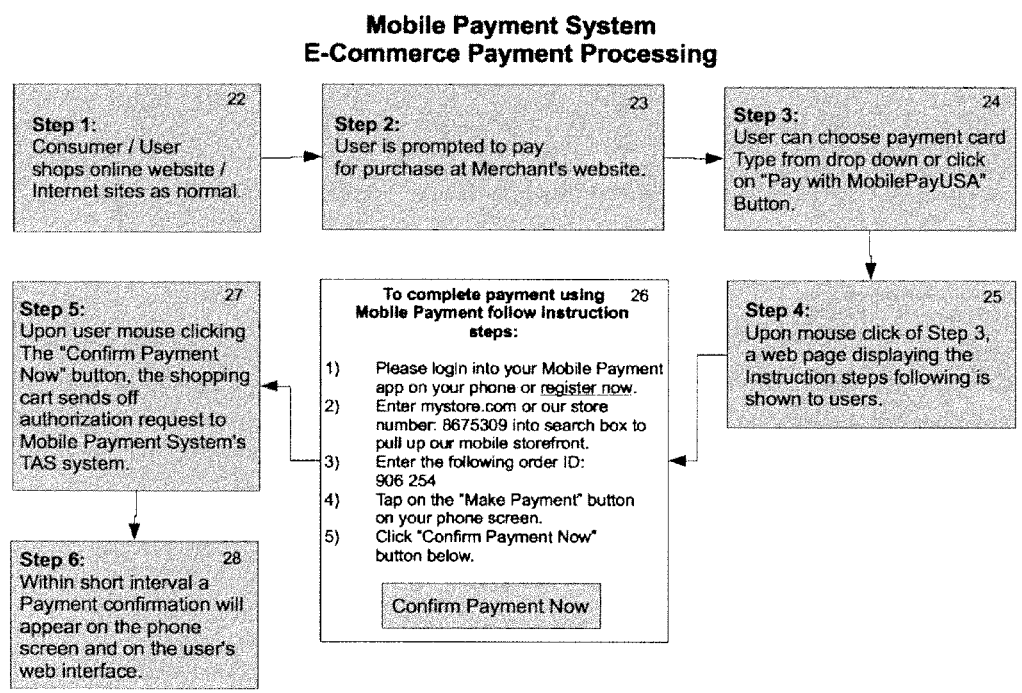
FIG. 10 illustrates one embodiment of the mobile payment system e-commerce payment processing solution.

FIG. 10 illustrates one embodiment that uses the mobile payment software to authorize e-commerce transactions. This is accomplished by the consumer/user shopping online at an Internet website 22. Once the user has identified product from the online merchant's website, the user is prompted to pay for the purchase at the merchant's website 23. The user can choose payment card types from either a drop down menu or by clicking on a button 24. The user then selects the "Pay with mobile payment" button or drop down menu choice as the payment method 25. Upon selection, the user is prompted with instruction steps 26 outlining how to process the transaction on their mobile device. The instructions may include the merchant's store ID and the user's order ID. Upon identifying the merchant's store in the application on the mobile device, the user enters their order ID and selects the "Make Payment" button on the mobile device. The user then selects the "Confirm Payment Now" on the website. Upon the user mouse clicking the "Confirm Payment Now" button, the merchant's website shopping cart ("shopping cart" is synonymous with POS or POS for website transactions) sends off authorization request to the Mobile Pay USA's TAS 27. Within a short interval, the user receives a payment confirmation on the phone and the merchant receives a payment confirmation related to the user's order and a confirmation is displayed for view by user on the web 28.

Figure 11:
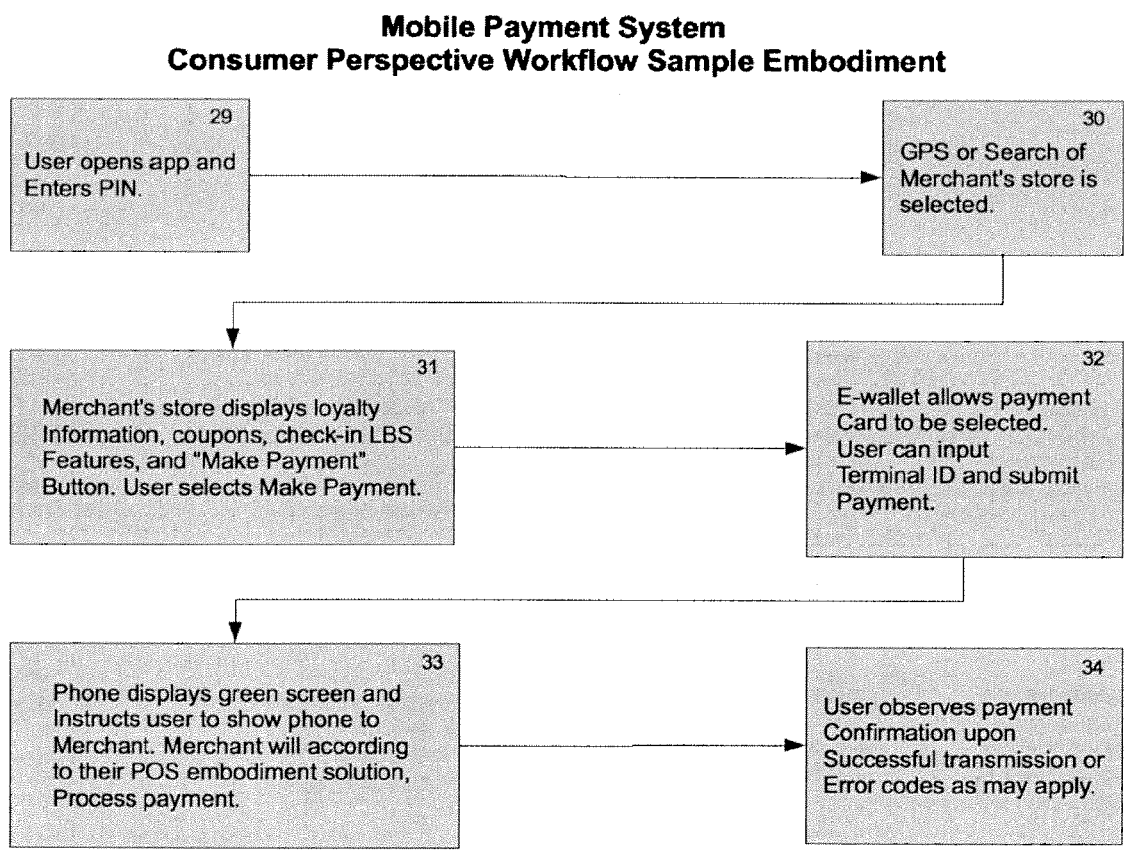
FIG. 11 illustrates one embodiment of the mobile payment system consumer perspective workflow.

FIG. 11 illustrates one embodiment of the mobile payment consumer perspective workflow. The user's experience is consistent with the application on the mobile device for all transactions. An example involves a user opening the application on the mobile device and entering their user PIN 29.

Upon entering the PIN, the application conducts a GPS location lookup 30 (if enabled on device) and shows the merchant store on a short list. If GPS is disabled on the device, the user can search 30 for the store using the application's search functions. Once the store is identified and selected by the user, the merchant's store may display loyalty information, coupons, check-in LBS (Location Based Services) features, and display a "Make Payment" button 31. The user then selects the "Make Payment" button 31 when they are ready to make a payment to the merchant. The e-wallet allows the user to choose the payment card of user's choice from within the application and the user inputs the TID (terminal ID) and selects the "Submit Payment" button 32. The phone displays a green screen and instructs the user to show the phone to the merchant 33. This facilitates a non-verbal transaction between the consumer and the merchant. The merchant according to their POS embodiment solution, will process payment 33. The user observes payment confirmation upon a successful transaction or view error codes as may apply such as in the case with a NSF (Non-Sufficient Funds) 34.

Figure 12:
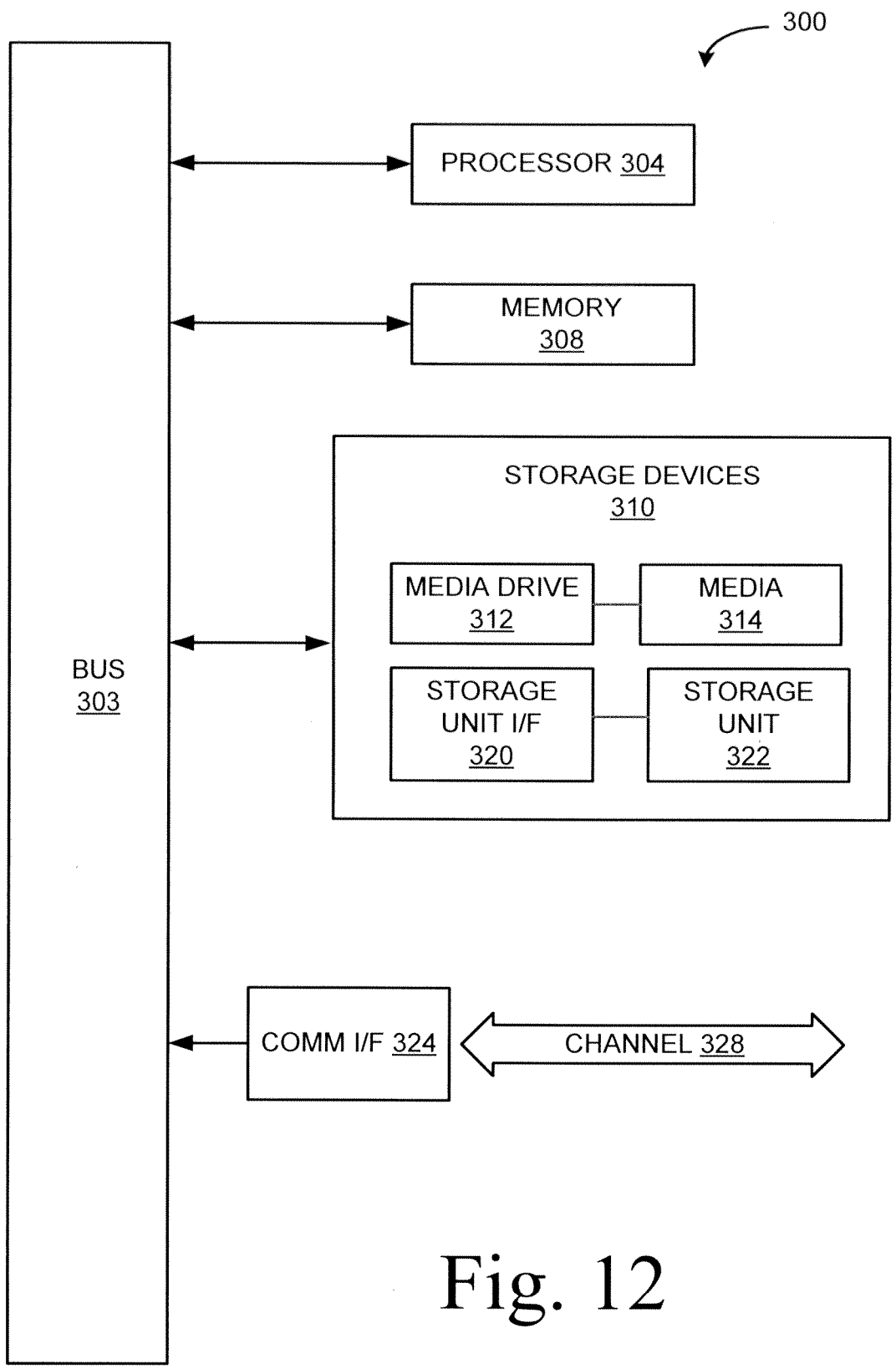
FIG. 12 illustrates an example computing module on which various features of embodiments of the invention may be implemented.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 12. Various embodiments are described in terms of this example-computing module 300. After reading this description, it will become apparent to a person skilled in the relevant art how to implement the invention using other computing modules or architectures.

Referring now to FIG. 12, computing module 300 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 300 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 300 might include, for example, one or more processors, controllers, control modules, or other processing devices, such as a processor 304. Processor 304 might be implemented using a general-purpose or special-purpose processing engine such as, for example, a microprocessor, controller, or other control logic. In the illustrated example, processor 304 is connected to a bus 302, although any communication medium can be used to facilitate interaction with other components of computing module 300 or to communicate externally.

Computing module 300 might also include one or more memory modules, simply referred to herein as main memory 308. For example, preferably random access memory (RAM) or other dynamic memory, might be used for storing information and instructions to be executed by processor 304. Main memory 308 might also be used for storing temporary variables or other intermediate information during execution of instructions to be executed by processor 304. Computing module 300 might likewise include a read only memory ("ROM") or other static storage device coupled to bus 302 for storing static information and instructions for processor 304.

The computing module 300 might also include one or more various forms of information storage mechanism 310, which might include, for example, a media drive 312 and a storage unit interface 320. The media drive 312 might include a drive or other mechanism to support fixed or removable storage media 314. For example, a hard disk drive, a floppy disk drive, a magnetic tape drive, an optical disk drive, a CD or DVD drive (R or RW), or other removable or fixed media drive might be provided. Accordingly, storage media 314 might include, for example, a hard disk, a floppy disk, magnetic tape, cartridge, optical disk, a CD or DVD, or other fixed or removable medium that is read by, written to or accessed by media drive 312. As these examples illustrate, the storage media 314 can include a computer usable storage medium having stored therein computer software or data.

In alternative embodiments, information storage mechanism 310 might include other similar instrumentalities for allowing computer programs or other instructions or data to be loaded into computing module 300. Such instrumentalities might include, for example, a fixed or removable storage unit 322 and an interface 320. Examples of such storage units 322 and interfaces 320 can include a program cartridge and cartridge interface, a removable memory (for example, a flash memory or other removable memory module) and memory slot, a PCMCIA slot and card, and other fixed or removable storage units 322 and interfaces 320 that allow software and data to be transferred from the storage unit 322 to computing module 300.

Computing module 300 might also include a communications interface 324. Communications interface 324 might be used to allow software and data to be transferred between computing module 300 and external devices. Examples of communications interface 324 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 324 might typically be carried on signals, which can be electronic, electromagnetic (which includes optical) or other signals capable of being exchanged by a given communications interface 324. These signals might be provided to communications interface 324 via a channel 328. This channel 328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 308, storage unit 320, media 314, and signals on channel 328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 300 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or should be read as meaning "at least one," "one or more" and or the like; adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A mobile payment system, comprising:
   a merchant point of sale system;
   a third party payment network comprising a processing platform, card association, or other processing host for the formal authorization and settlement of customer and merchant payment information;
   a transaction authorization system that coordinates the activities among a customer device that hosts a consumer mobile application, the merchant point of sale system, and the third party payment network, in order to authorize and void transactions;
   a tender type button for initiating a transaction by the merchant point of sale or payment system, wherein the button processes the transaction with the mobile payment service provider's issuer identification number and forwards it to transaction authorization system directly from the point of sale or indirectly such as through middleware, frontend switch, gateway, processor, payment networks, or a backend switch; and
   a terminal identification that is read by the customer at the point of sale and entered into the consumer mobile application at the point of sale for linking the customer and merchant upon the transaction reaching the transaction authorization system.

2. The mobile payment system of claim 1, wherein the third party payment network provides additional features and functionalities including transaction reporting, cardholder data storage, fraud screening and protection, and related processing offerings.

3. The mobile payment system of claim 1, wherein the transaction authorization system stores and retrieves loyalty information from a loyalty data store that is used by the merchant to offer discounts and additional services to the customer through the customer device.

4. The mobile payment system of claim 1, wherein the transaction authorization system stores tokenized versions of the customer's payment methods in a tokenized payment method data store.

5. The mobile payment system of claim 1, wherein the button is replaced by the use of a mobile payment card comprising the mobile payment service provider's issuer identification number and card number assigned to the merchant and capable of being magnetically swiped through the merchant point of sale system.

6. The mobile payment system of claim 5, wherein the mobile payment card is replaced by the merchant keying in the card number assigned to the merchant at the merchant point of sale system.

7. The mobile payment system of claim 1, further comprising a virtual terminal including a standalone software or hardware device.

8. The mobile payment system of claim 7, wherein the standalone software or hardware device selected from the group consisting of: a mobile personal digital assistant; a mobile phone; a mobile device; and a computer based system, device or software application installed alongside the point of sale software and residing on the same platform and hardware of the merchant point of sale or existing as an independent device.

9. The mobile payment system of claim 1, wherein the customer device comprises a mobile device selected from the group consisting of: an iPhone; an iPad; an iTouch; an Android; a Windows-based mobile device; and a Research In Motion Blackberry device.

10. The mobile payment system of claim 1, wherein the merchant communicates a terminal identification to the customer by posting a sticker, label, or other display of the terminal identification on or near the merchant point of sale.

11. The mobile payment system of claim 10, wherein the terminal identification comprises a numeric value, a barcode, a quick response barcode, or other representation consisting of a unique value for a transaction occurring at a point of time with the merchant and the specific terminal.

12. The mobile payment system of claim 10, wherein the terminal identification is transmitted to the customer device using Bluetooth, radio frequency identification, near-field communication, quick response codes, or Two Factor Authentication.

13. The mobile payment system of claim 1, wherein the merchant point of sale system comprises a point of sale system used for electronic commerce or a conventional point of sale system located in a real world store.

14. The mobile payment system of claim 1, wherein the customer and merchant are linked upon the transaction reaching the transaction authorization system by using a known location of the merchant and the instant location of the customer accessing the consumer mobile application as determined by global positioning satellite in the customer device hosting the consumer mobile application.

15. A method for performing a transaction using a mobile payment system including a merchant point of sale system, a third party payment network comprising a processing host for the formal authorization and settlement of customer and merchant payment information, and a transaction authorization system that coordinates the activities among a customer device, the merchant point of sale system, and the third party payment network, in order to authorize and void transactions, the method comprising:
  receiving a transaction from a customer device that hosts a consumer mobile application at the transaction authorization system for a purchase at the merchant point of sale;
  storing the transaction at the transaction authorization system as a pending transaction;
  submitting the transaction to the third party payment network for account authorization; and
  allowing the customer to utilize the consumer mobile application to access an automated teller machine for performing a consumer financial transaction, wherein a terminal identification is read by the customer at the point of sale and entered into the consumer mobile application at the point of sale for linking the customer and merchant upon the transaction reaching the transaction authorization system.

16. The method of claim 15, further comprising providing historical transactions for review by the customer and merchants as facilitated by the transaction authorization system.

17. The method of claim 15, wherein the account authorization comprises a sufficient or non-sufficient fund verification.

18. The method of claim 15, wherein the consumer mobile application enables a function to allow the customer to send a payment to any other mobile payment service provider's customers, thus creating a customer-to-customer transaction relationship.

19. The method of claim 15, wherein the consumer financial transaction comprises making a cash withdrawal.

20. The method of claim 15, wherein the consumer financial transaction comprises making a cash withdrawal and making a cash deposit.

* * * * *